(12) United States Patent
O'Brien

(10) Patent No.: US 7,900,189 B2
(45) Date of Patent: Mar. 1, 2011

(54) COMPUTER PROGRAM GENERATING

(75) Inventor: Wayne P. O'Brien, Staunton, VA (US)

(73) Assignee: Raytheon Company, Waltham, MA (US)

( * ) Notice: Subject to any disclaimer, the term of this patent is extended or adjusted under 35 U.S.C. 154(b) by 984 days.

(21) Appl. No.: 11/737,931

(22) Filed: Apr. 20, 2007

(65) Prior Publication Data

US 2007/0250826 A1    Oct. 25, 2007

Related U.S. Application Data

(60) Provisional application No. 60/745,302, filed on Apr. 21, 2006.

(51) Int. Cl.
*G06F 9/44* (2006.01)
(52) U.S. Cl. ................................ 717/106; 717/108
(58) Field of Classification Search ............... 717/106, 717/108
See application file for complete search history.

(56) References Cited

U.S. PATENT DOCUMENTS

| | | | |
|---|---|---|---|
| 5,699,310 A | 12/1997 | Garloff et al. | |
| 6,851,105 B1 | 2/2005 | Coad et al. | |
| 6,851,107 B1 | 2/2005 | Coad et al. | |
| 7,003,502 B1 * | 2/2006 | Wizdo et al. | 706/45 |
| 7,392,232 B1 * | 6/2008 | Wizdo et al. | 706/45 |
| 7,657,498 B2 * | 2/2010 | Palaniappan | 706/50 |
| 7,827,565 B2 * | 11/2010 | Minium et al. | 719/330 |
| 2002/0091990 A1 | 7/2002 | Little et al. | |
| 2002/0147606 A1 * | 10/2002 | Hoffmann et al. | 705/1 |
| 2005/0015743 A1 | 1/2005 | O'Brien | |
| 2005/0197991 A1 | 9/2005 | Wray et al. | |
| 2007/0074182 A1 | 3/2007 | Hinchey et al. | |

OTHER PUBLICATIONS

Rus et al. "Knowledge Management in Software Engineering", Nov. 29, 2001, 57 pages.*
O'Brien, Wayne P., "Breakdown in Controls in Automated Systems", Dissertation submitted in partial fulfillment of requirements for degree of Doctor of Philosophy, George Mason University, Fairfax, VA, Spring 2006, 371 pages.

* cited by examiner

*Primary Examiner* — Wei Y Zhen
*Assistant Examiner* — Phillip H Nguyen
(74) *Attorney, Agent, or Firm* — Daly, Crowley, Mofford & Durkee, LLP

(57) ABSTRACT

In one aspect, a method to generate executable instructions includes incorporating tacit knowledge into an artifact and actively linking electronically the artifact to at least one other artifact of a system. The artifact and the at least one other artifact form a meta-artifact associated with a domain. The method also includes generating the executable instructions based on the meta-artifact. The meta-artifact is configured to dynamically change over time through an iterative process.

17 Claims, 7 Drawing Sheets

COMPUTER PROGRAM GENERATING

RELATED APPLICATION

The patent application claims priority to provisional patent application Ser. No. 60/745,302, filed Apr. 21, 2006 and entitled "META-ARTIFACT PROCESS-CAPTURING TACIT KNOWLEDGE FOR REQUIREMENTS," which is incorporated herein in its entirety.

BACKGROUND

Generating a computer program may involve generating a set of domain rules that set out the requirements for the computer program for a domain. Known techniques for designing computer programs typically involve identifying requirements without identifying domain rules. The absence of identified domain rules, however, may result in inefficient and ineffective computer program generation for a domain. Consequently, known techniques for designing computer programs may be unsatisfactory in certain situations.

SUMMARY

In one aspect, a method to generate executable instructions includes incorporating tacit knowledge into an artifact and actively linking electronically the artifact to at least one other artifact of a system. The artifact and the at least one other artifact form a meta-artifact associated with a domain. The method also includes generating the executable instructions based on the meta-artifact. The meta-artifact is configured to dynamically change over time through an iterative process.

In another aspect, an article includes a machine-readable medium that stores a first set of executable instructions to generate a second set of executable instructions. The first set of instructions cause a machine to incorporate tacit knowledge into an artifact and actively link electronically the artifact to at least one other artifact of a system. The artifact and the at least one other artifact form a meta-artifact associated with a domain. The first set of executable instructions cause a machine to generate the second set of executable instructions based on the meta-artifact. The meta-artifact is configured to dynamically change over time through an iterative process.

In a further aspect, an apparatus to generate executable instructions includes circuitry to incorporate tacit knowledge into an artifact and actively link electronically the artifact to at least one other artifact of a system. The artifact and the at least one other artifact form a meta-artifact associated with a domain. The apparatus further includes circuitry to generate the executable instructions based on the meta-artifact. The meta-artifact is configured to dynamically change over time through an iterative process.

In a still further aspect, a method to generate executable instructions includes actively linking electronically a first artifact to at least one other artifact of a system. The artifact and the at least one other artifact forming a meta-artifact associated with a domain. The method also includes generating the executable instructions based on the meta-artifact, updating the meta-artifact based on the executable instructions generated and generating different executable instructions based on updating the meta-artifact. The meta-artifact is configured to dynamically change over time through an iterative process.

DETAILED DESCRIPTION

Figure 1:
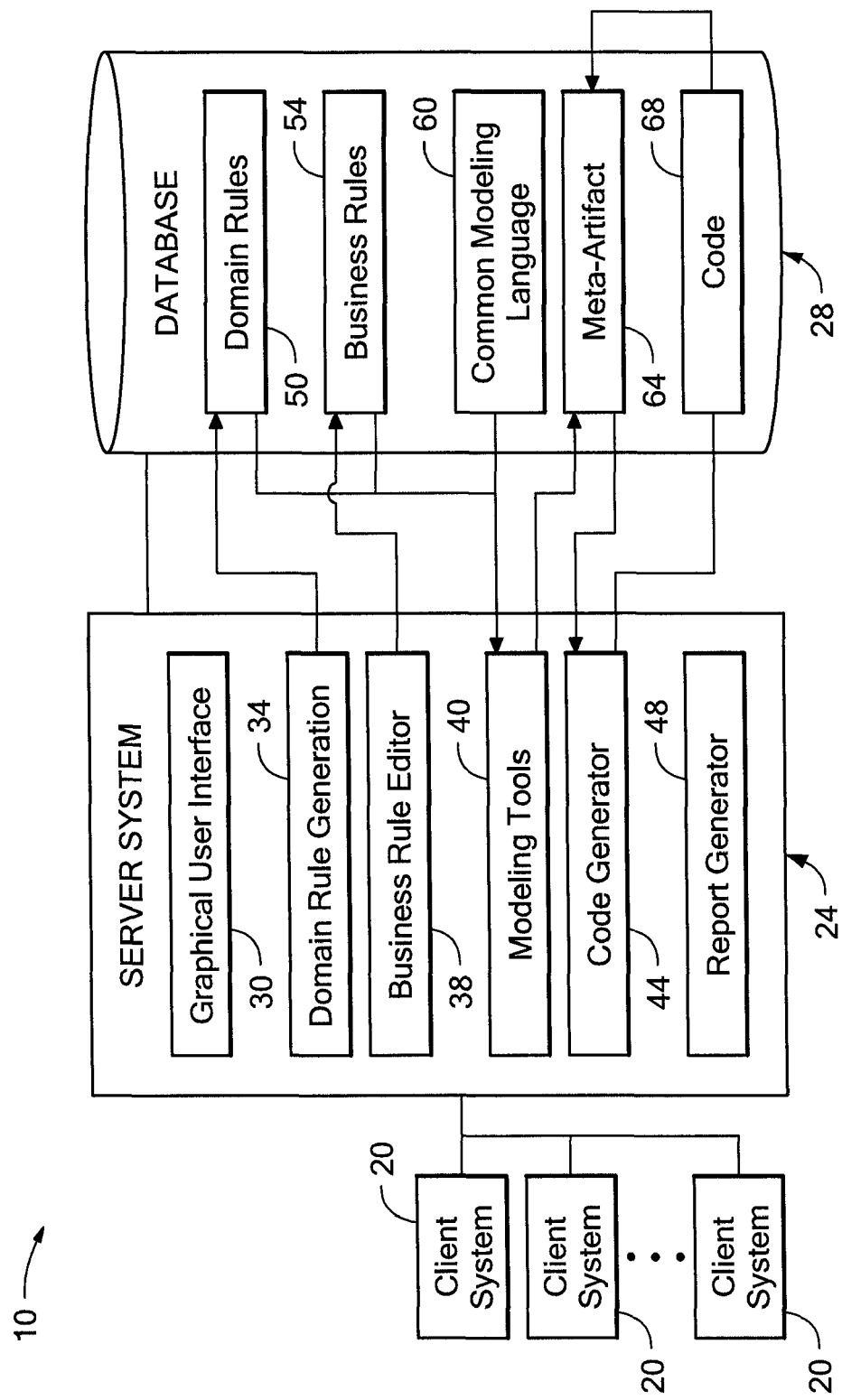
FIG. 1 is a block diagram of an example of a system to generate a computer program for a domain.

FIG. 1 is a block diagram illustrating one embodiment of a system 10 to generate a computer program. In general, system 10 is involved in the generation of a substantially complete set of domain rules to define the problem space of the computer program generation. Invariant domain rules and customizable business rules are used to generate the program.

In one example, system 10 includes one or more client systems 20, a server system 24, and a database 28 coupled as shown in FIG. 1. A client system 20 allows a user to communicate with server system 24 to generate computer programs. Server system 24 manages applications for generating computer programs, such as a graphical user interface (GUI) 30, a domain rule generation module 34, a business rule editor 38, modeling tools 40, a code generator 44, and a report generator 48. Database 28 stores data that may be used by server system 24. Database 28 may include, for example, domain rules 50, business rules 54, a common modeling language 60, a meta-artifact 64, and code 68.

In operation, domain rule generation module 34 generates a substantially complete set of domain rules 50 that includes invariant rules that may be used to define a domain. Business rule editor 38 is used to customize business rules 54 for a particular computer program. Modeling tools 40 may use domain rules 50 and business rules 54, which may be expressed according to common modeling language 60, in order to generate a meta-artifact 64. A user may manipulate meta-artifact 64 to generate the computer program. Code generator 44 generates code 68 according to meta-artifact 64, and may also operate to check code 68 and meta-artifact 64 for syntax compliance and for consistency. Further, generated code 68 may be further added to the meta-artifact 64. Report generator 48 may be used to generate a report describing the computer program.

In one example, code 68 refers to executable instructions configured to be stored on a machine-readable medium that cause a machine to perform one or more tasks.

In one example, system 10 may operate to generate a computer program using object-oriented technology. According to object-oriented technology, a computer program may be viewed as a collection of discreet objects representing entities that are self-contained collections of data structures and routines that interact with other objects. Object-oriented programming involves both analysis and generation. Object-oriented analysis identifies component objects and system requirements, and describes how the component objects and system requirements interact to perform specific tasks. Typically, analysis attempts to reuse existing solutions. Code generation involves generating a computer program in which the objects may be efficiently adapted to perform the tasks.

In one example, client systems 20 may allow one or more users to concurrently generate a computer program. Users may include programmers, stakeholders, or any other person or identifier identifying a person. Stakeholders may include engineers from any of a number of fields such as the network, hardware, software, human factors, or database fields. Stakeholders may also include persons, for example, from developer disciplines, end-users, domain experts, managers, regulators, auditors and certifiers. GUI 30 allows users of client systems 20 to access applications of server system 24.

Domain rule generation module 34 generates domain rules 50. Domain rules 50 include invariant rules that define and characterize a domain that may be used to determine a problem space and a solution space. Domain rules reflect, for example, underlying principles, theories, longstanding practices, and traditions of the domain, such as the principles of war or accounting theory, and so forth. A substantially complete set of domain rules may anticipate substantially all possible applications of the domain, and may provide a framework from which substantially all solutions of the solution space may be generated. Domain rules 50 may be selected according to any suitable procedure to generate any suitable problem space, and may be generated through successive iterations of the generation process.

TABLE 1 lists examples of domain rules 50 from accounting theory.

TABLE 1

| Domain Rule | Prescriptive Description |
| --- | --- |
| Duality | Offset each increment to resources with a corresponding decrement, and vice versa. Characterize increments by transferring in (purchases and cash receipts) and the corresponding decrements by transferring out (sales and cash disbursements). |
| Accounting Equation | Ensure Assets = Liabilities + Owner's Equity |
| Income Equation | Ensure Revenues − Expenses = Net Income (or Net Loss) |
| Accounting period | Ensure transaction effective date between Accounting Period End Date and Accounting Period Begin Date |
| Accrual | Calculate portion of expense or revenue attributable to this accounting period, based on when the corresponding purchase or sate event occurred, not when cash is received or disbursed |
| Realization | Recognize when the expense occurred based on when the physical item or service was received |
| Matching | Match revenue that occurred in the accounting period with associated expenses |
| Money Measurement | Provide a common unit of measure for all calculations by translating all measurements into monetary units |
| Entity | Define the boundaries of the organization for which accounts are kept and reports are made |
| Going Concern | Prepare financial reports based on the assumption that the organization will continue its current operations indefinitely, not based on current liquidation value |
| Cost | Value assets based on original cost, not current value and not adjusted for inflation or deflation (i.e. using only monetary units attributed to the purchase at the time of purchase) |
| Consistency | Do not change the accounting method for a kind of event or asset from one accounting period to the next in order to enhance comparability of accounting reports from period to period |
| Conservatism | Recognize revenues and gains slower than expenses and losses |
| Materiality | Do not measure or record events that are insignificant, applying consistency and conservatism in determining significance |

TABLE 2 lists examples of domain rules 50 from military theory.

TABLE 2

| Domain Rule | Prescriptive Description |
| --- | --- |
| Set the Objective | Direct every military mission toward a clearly defined, decisive, and attainable objective. Commanders direct the use of available combat power toward clearly defined, attainable, and decisive goals. The proper objective ("purpose") in battle is the destruction of the enemy's combat forces. To do this, however, subordinate commanders must be given "terrain objectives" toward which they move. |
| Take the Offensive | Seize, retain, and exploit the initiative. Offensive action is the most effective and decisive way to attain a clearly defined common objective. |
| Mass the Effects | Mass the effects of synchronizing the employment of overwhelming combat power at the decisive place and time to gain the objective. Achieve military superiority at the decisive place and time. Mass in this sense does not mean more men. Military superiority can be attained against a more numerical enemy if you have superiority in such things as weapons, leadership, morale, and training. Mass is generally gained by maneuver. |
| Use Forces Economically | Employ all combat power available in the most effective way possible to gain the objective; allocate essential combat power to secondary efforts. Allocate to secondary efforts minimum essential combat power. This is a misleading term because it does not mean what it sounds like. It does not mean do the job with minimum combat power. Note that the principle |

TABLE 2-continued

| Domain Rule | Prescriptive Description |
| --- | --- |
| | pertains to secondary efforts, and it is the means by which a superior general achieves mass as defined above. Mass and Economy of Force are on opposite sides of the same coin. |
| Maneuver Combat Power | Place the enemy in a position of disadvantage through the flexible application of combat power. Position your military resources to favor the accomplishment of your mission. Maneuver in itself can produce no decisive results, but if properly employed it makes decisive results possible through the application of the principles of the offensive, mass, economy of force, and surprise. It is by maneuver that a superior general defeats a stronger adversary. |
| Use Unity of Command | Designate a single decision maker responsible for all activities related to an operation. Focus all activity upon a single objective. |
| Be Secure | Never permit the enemy to acquire an unexpected advantage. Another definition would be to take all measures to prevent surprise. A unit in bivouac, for example, uses outposts and patrols for security. |
| Use Surprise | Strike the enemy at a time, at a place, or in a manner for which he is unprepared. Accomplish your purpose before the enemy can effectively react. Tactical or strategic surprise does not mean open-mouthed amazement. Thus, a corps may be surprised by an attack it has seen coming for several hours if this attack is too powerful for it to resist by itself and if no other unit is within supporting distance. |
| Use Simplicity | Prepare clear, uncomplicated plans and clear, concise orders to ensure thorough understanding. |

Domain rule generation module 34 may identify the boundaries of a domain, and determine commonalities and variations among systems that meet the requirements. The boundaries and requirements may be defined for a domain in terms of the domain rules extracted from the body of knowledge for the domain.

Business rules 54 include rules that may be customized to fit a particular application. Business rules may include, for example, military rules of engagement, or business policies concerning fees for overdrawn accounts. While domain rules 50 are invariant, business rules 54 are volatile.

TABLE 3 presents example business rules for accounting theory.

TABLE 3

| Business Rules | Prescriptive Instructions |
| --- | --- |
| Financial - Compliance with budget policies | If upon approval of this request for purchase order, total encumbered dollars for this subsidiary ledger account would be greater than the budget for that account, reject the request |
| Operational - Compliance with authorization polices | If the amount for this purchase order exceeds the signature authority of the Buyer (purchasing agent), reject the purchase order |
| Regulatory - Compliance with tax law and regulation | if the type of asset-type specified for this subsidiary ledger account does not match the asset type for this depreciation method, reject the transaction: either the wrong subsidiary ledger account is being used to set up this asset or the wrong depreciation method has been specified |
| Fraud - Compliance with legal and policy requirements | Select all transactions for a specified subsidiary ledger account for a specified time period exceeding a specified dollar amount, then process the details of those transactions (e.g., name of vendor, name of purchasing agent, address of vendor, shipping address) through specified neural network to detect patterns of fraudulent activity. |

TABLE 4 presents example business rules for military theory.

TABLE 4

| Rules of Engagement | Prescriptive Instructions |
| --- | --- |
| Use armed force as the last resort | When possible, the enemy wilt be warned first and allowed to surrender. Armed civilians will be engaged only in self-defense. |

TABLE 4-continued

| Rules of Engagement | Prescriptive Instructions |
| --- | --- |
| | Civilian aircraft will not be engaged without approval from above division level unless it is in self-defense. |
| Avoid harming civilians unless necessary to save US lives. | If possible, try to arrange for the evacuation of civilians prior to any US attack.<br>If civilians are in the area, do not use artillery, mortars, armed helicopters, AC-130s, tube- or rocket-launched weapons, or M551 main guns against known or suspected targets without the permission of a ground maneuver commander, LTC or higher (for any of these weapons).<br>If civilians are in the area, all air attacks must be controlled by a FAC or FO.<br>If civilians are in the area, close air support (CAS), white phosphorus, and incendiary weapons are prohibited without approval from above division level.<br>If civilians are in the area, do not shoot except at known enemy locations.<br>If civilians are not in the area, you can shoot at suspected enemy locations. |
| Avoid harming civilian property unless necessary to save US lives | Public works such as power stations, water treatment plants, dams, or other utilities may not be engaged without approval from above division level.<br>Hospitals, churches, shrines, schools, museums, and any other historical or cultural site will not be engaged except in self-defense. |
| Treat all civilians and their property with respect and dignity. | Before using privately owned property, check to see if any publicly owned property can substitute.<br>No requisitioning of civilian property without permission of a company-level commander and without giving a receipt.<br>If an ordering officer can contract for the property, then do not requisition it.<br>No looting.<br>Do not kick down doors unless necessary.<br>Do not sleep in their houses.<br>If you must sleep in privately owned buildings, have an ordering officer contract for it. |
| Control civilians engaged in looting | Senior person in charge may order warning shots.<br>Use minimum force but not deadly force to detain looters.<br>Defend Panamanian (and other) lives with minimum force including deadly force when necessary. |
| Secure and protect roadblocks, checkpoints, and defensive positions | Mark all perimeter barriers, wires, and limits.<br>Erect warning signs.<br>Establish second positions to hastily block those fleeing.<br>Senior person in charge may order warning shots to deter breach.<br>Control exfiltrating civilians with minimum force necessary.<br>Use force necessary to disarm exfiltrating military and paramilitary.<br>Attack to disable, not destroy, all vehicles attempting to breach or flee.<br>Vehicle that returns or initiates fire is hostile. Fire to destroy hostile force.<br>Vehicle that persists in breach attempt is presumed hostile. Fire to destroy hostile force.<br>Vehicle that persists in flight after a blocking attempt IAW instruction 2b is presumed hostile. Fire to destroy hostile force. |

Business rules 54 may be maintained at database 28 and customized by business rules editor 38. As an example, business rules 54 may be stored in a table, and a user may define a specific business rule 54 by revising the table. Business rule editor 38 may be used to perform security audits on business rules 54, analyze business rules 54, check new rules before adding them to database 28, and apply business rules 54 to decision support tools.

Modeling tools 40 generate a meta-artifact 64 that represents the computer program to be generated, and may include, for example, nodes representing objects with operations performed by the computer program and branches representing relations among the objects. Code 68 includes the code that executes the computer program represented by a meta-artifact 64.

Modeling tools 40 may include, for example, modeling tools provided by RATIONAL SOFTWARE such as RATIONAL ROSE REAL-TIME (RRT) modeling and code generation tool. Modeling tools 40 may also include tools that include requirements management, configuration management, testing, performance optimization, and documentation.

The meta-artifact 64 may be actively linked to code 68 such that modeling tools 40 may provide dynamic views of a meta-artifact 64 to aid in the generation of the computer program. For example, as code 68 is being run, a node of meta-artifact 64 corresponding to code 68 that is being run may be highlighted, for example, the node may be displayed in a green color. As another example, if an inconsistency is found in code 68, a node of meta-artifact 64 corresponding to code 68 having the inconsistency may be highlighted. For example, the node may be displayed in a red color. Visual indicators provided as the code executes may allow for visual verification and validation of code 68. Visual verification and validation used in conjunction with publish-and-subscribe interfaces may provide for assurance of preserving interoperability.

Different meta-artifacts 64 may present different views of the computer program. Meta-artifacts 64 may include, for example, a domain model that establishes the context of the program, a business model that establishes an abstraction of an organization associated with the program, a use case model that establishes the program's functional and non-functional requirements, and an analysis model that establishes a conceptual design of the program. The models may be actively linked with each other to reflect aspects of each other. For example, domain model may be actively linked with a lower-level model, such that the lower-level model requirements reflect the requirements of the domain model. Examples of views are described in more detail with reference to FIGS. 4 and 5.

Domain rules 50, business rules 54, and formal methods 58 may be expressed according to common modeling language 60, which provides for a common representation for data used by system 10. Common modeling language 60 may include, for example, the Unified Modeling Language (UML) supported by OBJECT MANAGEMENT GROUP. In other examples, Common modeling language 60 may include any programming language used to implement models.

Common modeling language 60 may be used to represent artifacts of the program generation from semantic broadly-stated requirements through syntactic operating or executing components, and may be used to express artifacts from various stages of program generation. Stages may include the early stages of generation, for example, a request to automate an operation or to change an existing automated system, which are typically expressed as narrative descriptions. Subsequent phases such as concept exploration and definition, requirements analysis, program generation and verification, and software coding and testing may also be expressed using common modeling language 60. Common modeling language 60 provides for artifacts that are understandable to users at any stage of generation. Accordingly, users may determine whether the requirements have been captured by the program, and inconsistencies between stages may be more effectively resolved.

Code generator 44 in conjunction with modeling tools 40 may be used to iteratively generate code 68 for a computer program. Modeling tools 40 may be used to generate meta-artifact 64 from which code 68 is generated at an iteration. Meta-artifact 64 may be modified and new code 68 may be generated at successive iterations. At each iteration, detail may be added or requirements may be adjusted. Each iteration generates executable code 68 that may be tested in order to provide early views of the program, which may be used to confirm the proper operation of the program. Early feedback may serve to reduce risks by identifying problems early in the process.

Code generator 44 may include a debugger that may be used to check the syntax of code 68 and may also be used to detect logical inconsistencies between meta-artifact 64 and code 68. Debugger may also be used to check whether code 68 correctly implements meta-artifact 64 and satisfies formal statements.

Client system 20 and server system 24 may each operate on one or more processors and may include appropriate input devices, output devices, mass storage media, processors, memory, or other components for receiving, processing, storing, and communicating information according to the operation of system 10.

Client system 20 and server system 24 may be integrated or separated according to particular needs. For example, the present invention contemplates the functions of both client system 20 and server system 24 being provided using a single computer system, for example, a single personal computer. If client system 20 and server system 24 are separate, client system 20 may be coupled to server system 24 using one or more local area networks (LANS), metropolitan area networks (MANS), wide area networks (WANs), a global computer network such as the Internet, or any other appropriate wire line, wireless, or other links.

Database 28 may be local to or remote from server system 24, and may be coupled to server system 24 using one or more local area networks (LANs), metropolitan area networks (MANs), wide area networks (WANs), a global computer network such as the Internet, or any other appropriate wire line, wireless, or other links. Artifacts of database 28 may be actively linked in order to allow for more efficient generation of products from the artifacts. The active links may be used to integrate analysis, generation, and implementation of computer programs.

Modifications, additions, or omissions may be made to the system without departing from the scope of the invention. Moreover, the operation of the system may be performed by more or fewer modules. For example, the operation of modeling tools 40 and code generator 44 may be performed by one module, or the operation of modeling tools 40 may be performed by more than one module. Additionally, functions may be performed using any suitable logic comprising software, hardware, other logic, or any suitable combination of the preceding.

Figure 2:
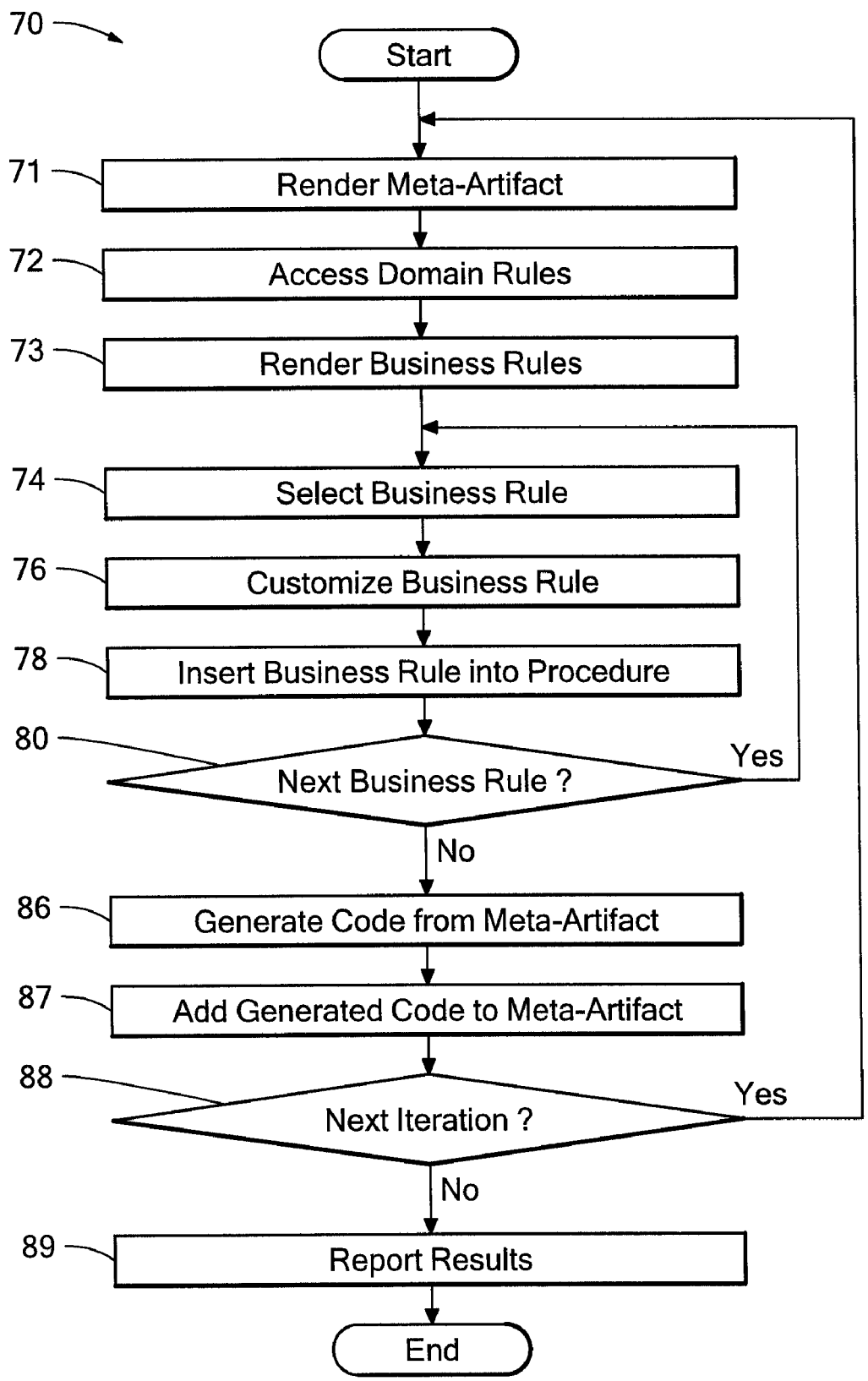
FIG. 2 is a flowchart of an example of a process to generate the computer program for the domain.

FIG. 2 depicts a process 70, which is an example of a process to generate a computer program. Meta-artifact 64 is rendered to a user (processing block 71). Domain rules 50 are accessed (processing block 72). Business rules 54 are rendered to the user (processing block 73). A business rule 54 is selected in response to a selection by the user (processing block 74). Business rule 54 is customized in response to selections by the user (processing block 76).

Business rule 54 is associated with meta-artifact 64 (processing block 78). If a next business rule is to be selected (processing block 80), process 70 returns to processing block 74, where the next business rule is selected. If no next business rule is to be selected (processing block 80), code 68 is generated from meta-artifact 64 (processing block 86). Modifications may be performed to meta-artifact 64 including incorporating the generated code from processing block 64 into the meta-artifact (processing block 87).

If there is a next iteration (processing block 88), business rules 54 are rendered (processing block 71). If there is no next iteration at step 88, the results are reported (processing block 89). The results may include code 68 generated from the finalized meta-artifact 64. After reporting the results, process 70 terminates.

Figure 3:
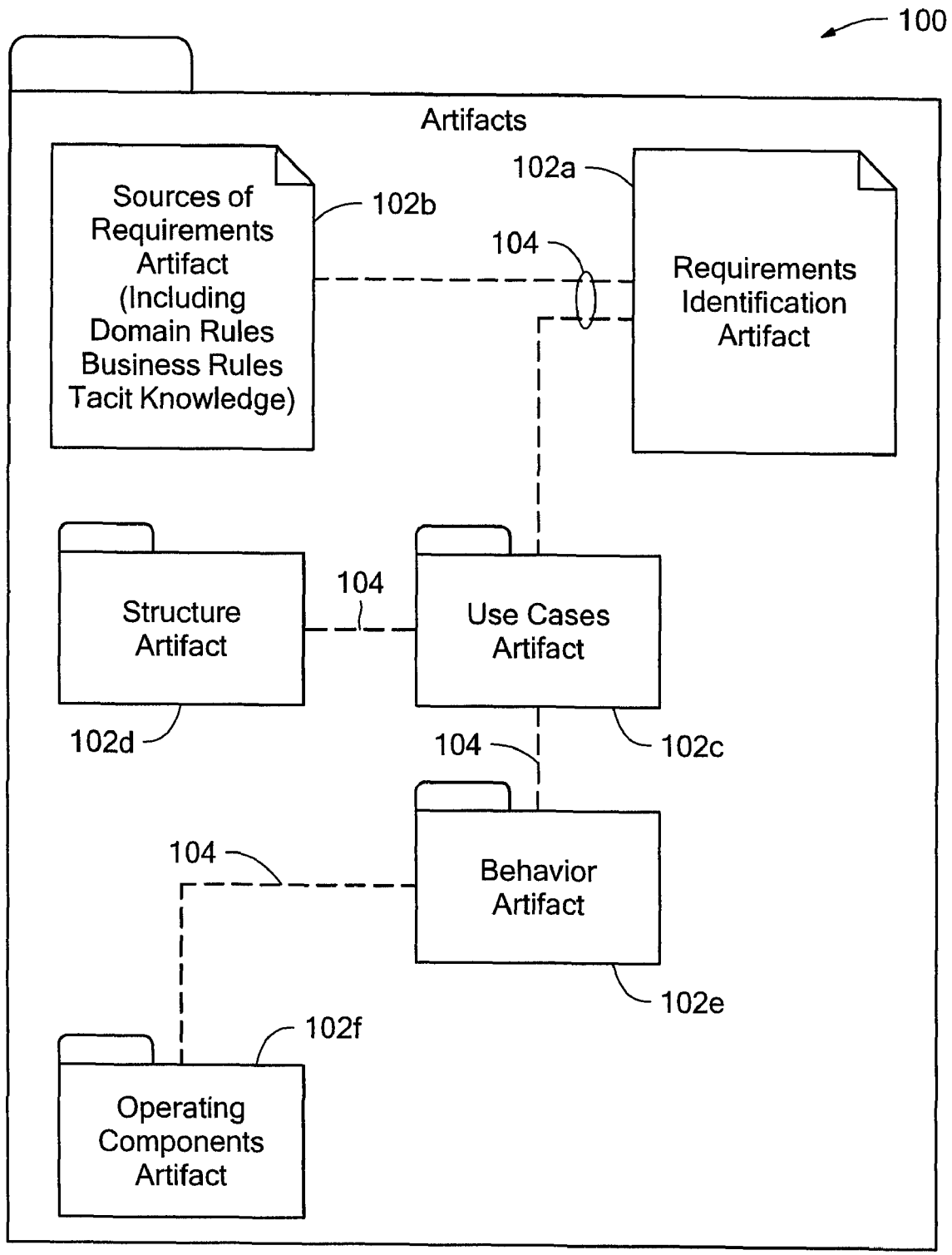
FIG. 3 is a diagram of an example of artifacts of a meta-artifact.

Meta-artifact 64 is distinguished from the traditional definitions of a model in that meta-artifact 64 may include the final product or may be the final product whereas a model is a plan to arrive at a final product but is exclusive of the final product. For example, generated code 68 becomes part of the meta-artifact 64. In another example, meta-artifact 64 itself is the final product. In a further example, meta-artifact may also include the raw material from which a model or models and the final products are made. An example of a raw material would be Sources of Requirements Artifact 102*b* (FIG. 3)

The meta-artifact 64 includes artifacts that are electronically linked together. Artifacts may include solicitations, requests, diagrams, models, architecture baseline, profiles, metrics, analysis results, frameworks, patterns, target platforms, topologies, test cases, test results, code and so forth. The artifacts are not limited to Unified Modeling Language (UML) primitives, such as an object or association, but may be more complex to include many primitives. The artifacts of the meta-artifact 64 are not limited to object-oriented representations or UML notation. Natural language documents such as request-for-proposals (RFPs) and less formal requests may be included. Because the artifacts include the software code, the running systems of the domain are also part of the meta-artifact 64.

Since the meta-artifact 64 is dynamically changing over time, it provides significant advantages compared to static models. Each iteration adds further details to the meta-artifact 64 making it more relevant to changing environments.

In one example, the meta-artifact 64 is the electronically linked set of all of the artifacts (natural language narratives, graphical representations, or software code in various forms (including any linked, executable code for a system) describing the desired and/or current systems) of development for all applications (systems) for a domain. The electronic linking of all of the artifacts of development contributes to the meta-artifact's representation of the total solution space.

In the meta-artifact 64, all artifacts, through the electronic linking, including software code, are part of the knowledge management narrative of the system and the domain. The meta-artifact 64, through process 70, continuously supplies the teleological (purposely developed) remedy, through an active semantic chain, to the entropy (loss of structure and explicitness) in knowledge about the system 10 that otherwise occurs with time as development progresses and during operation and maintenance of the system. That is, through the recursive application in process 70, knowledge captured in the meta-artifact 64 may be converted into action and action into additional knowledge in the meta-artifact.

The meta-artifact 64 provides the structure and explicit representation of the knowledge about the system 10 to prevent the entropy (loss of explicitness and structure) that would otherwise occur, by converting the tacit and explicit knowledge about the system into artifacts. The meta-artifact 64 preserves the tacit and explicit knowledge of the system as information (in the form of the artifacts) that can be converted into explicit knowledge, preventing the knowledge, through the use of the meta-artifact 64 in process 70, from receding into history (becoming forgotten with the passage of time) and becoming tacit, including knowledge that had been tacit (e.g., taken for granted as a routine) before conversion into artifacts. The meta-artifact 64 preserves the ontology of the problem space (requirements for the domain) and solution space (systems satisfying the requirements). When breakdowns occur stakeholders use the integrated modeling tools to create a view of the meta-artifact 64 to obtain understanding of the background for the explicit knowledge they have and of the routines they perform against the background.

The meta-artifact 64 eliminates the gap between the problem space and the solution space. Rather than being disconnected, as generally described in prior art approaches, the meta-artifact 64 treats the problem-space and solution space as different views. This would at first seem to contradict the problem-space focus of domain rules analysis. However, because of the initial comprehensive focus on the problem space, the frameworks and patterns of the meta-artifact 64 (viewed as part of the solution space) would be derived independently of the solution space. The meta-artifact 64, when applied to process 70, extends the modeling concept that the model is the application by applying the concept to entire domains. The meta-artifact 64 also extends the particulars of the concept beyond that of automatically generating code from the visual model (the basis for saying that the model is the application). That is, automatic code generation is just one of the sub-qualities noted for the meta-artifact 64.

The electronic linking of the artifacts in the meta-artifact 64 is comprehensive in the sense that the source code for software links all of the statements required to generate the executable code. Just as it is possible to corrupt the source code in some way that would break its linkage to the current executable code, it would be possible to break the global linkage within the meta-artifact 64.

In one example, the meta-artifact 64 provides a knowledge management narrative about a system that makes the background (tacit knowledge represented by the system) explicit. Narratives in knowledge management serve as a basic organizing principle of human cognition. Narratives, articulated as texts, may be seen as material traces of learning and collective remembering processes, social imprints of a meaningful course of events, documents and records of human action and allow people to articulate knowledge through discourse.

FIG. 3 is a diagram 100 depicting the relationship between artifacts stored at database 28. Diagram 100 may be rendered at client system 20. Folders 102 represent artifacts that may be used to collect elements including other artifacts in order to organize the development project. Dotted lines 104 represent links between the artifacts.

In one example, a Requirements Identification artifact 102*a* is linked to Sources of Requirements artifact 102*b* and use cases artifact 102*c*. Domain Rules 50, Business Rules 54 and tacit knowledge (which is further described later) are derived from Sources of Requirements Artifact 102*b*. The use cases folder 102*c* is linked to a Structure Artifact 102*d* and a Behavior Artifact 102*e*, which is linked to an Operating Components Artifact 102*f*.

Figure 4:
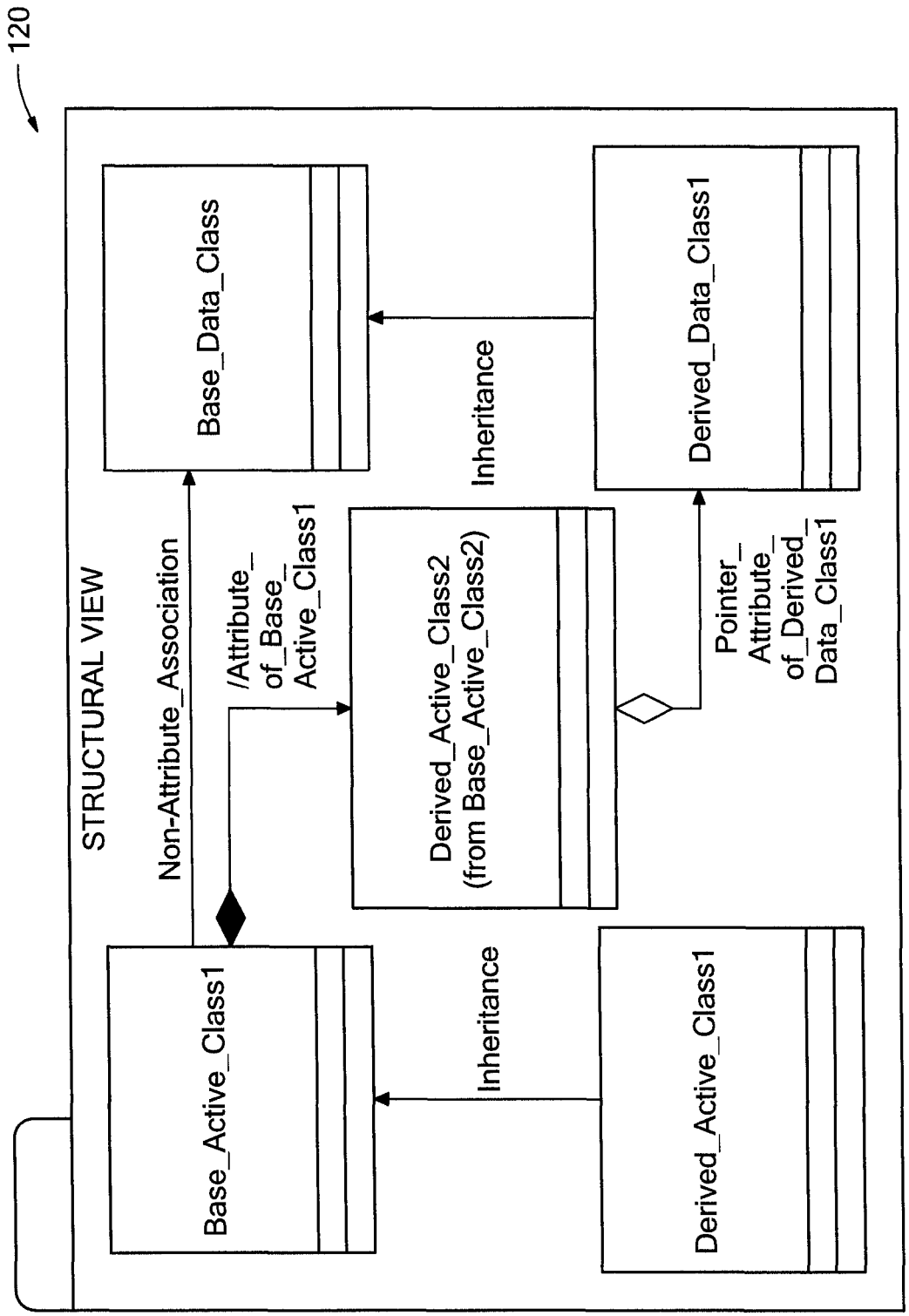
FIG. 4 is a diagram of an example of a structural view.
Figure 5:
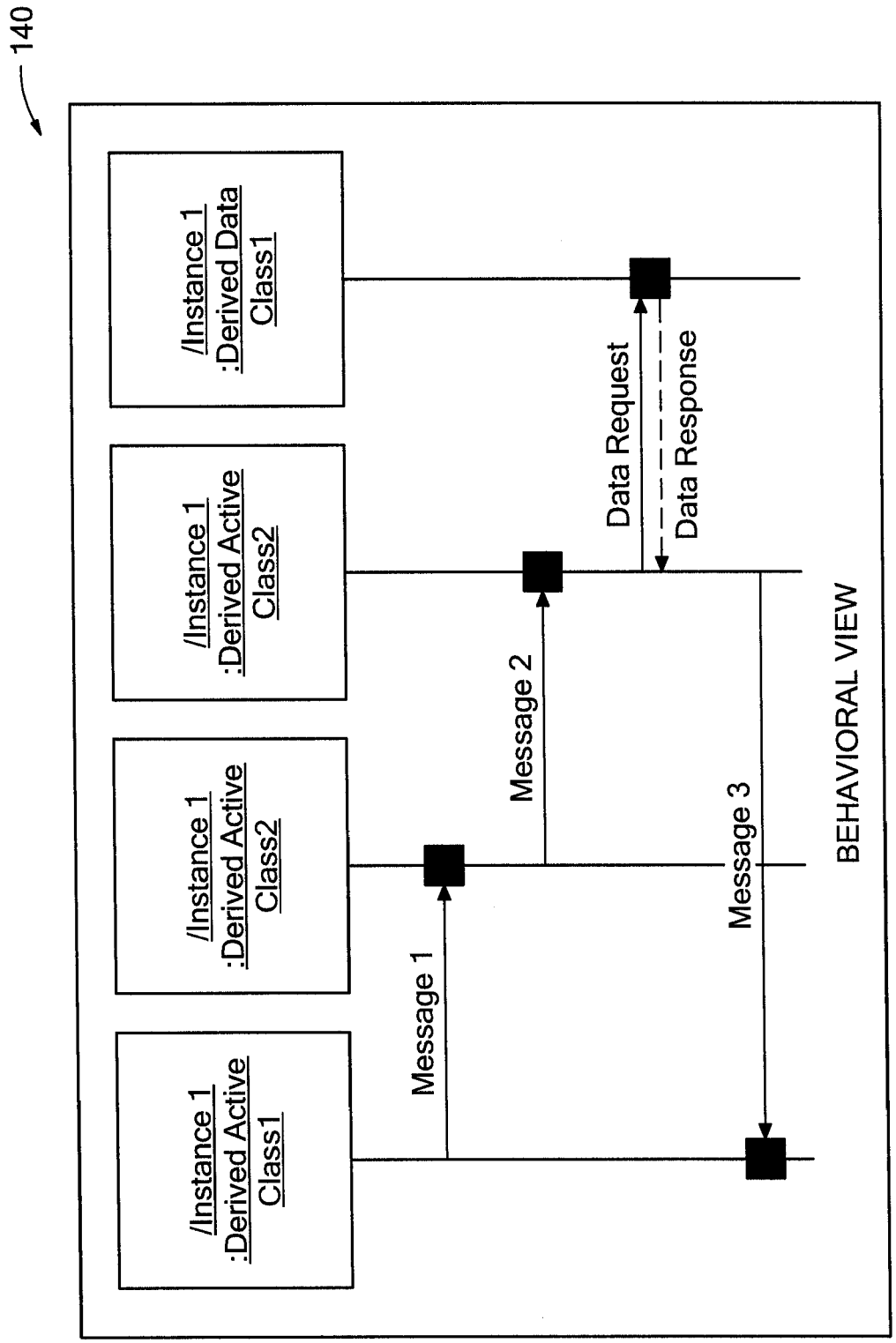
FIG. 5 is a diagram of an example of a behavioral view.

FIGS. 4 and 5 depict examples of views that may be presented by modeling tools 40. FIG. 4 is a diagram illustrating one embodiment of a structural view 120 of structure folder 102*d*. FIG. 5 is a diagram of one embodiment of a behavioral view 140 of behavior folder 102*e*. Views 120 and 140 are different views of the same program. As an example, derived active class 2 of structural view 120 corresponds to the instance of derived active class 2 of behavioral view 140.

Figure 6:
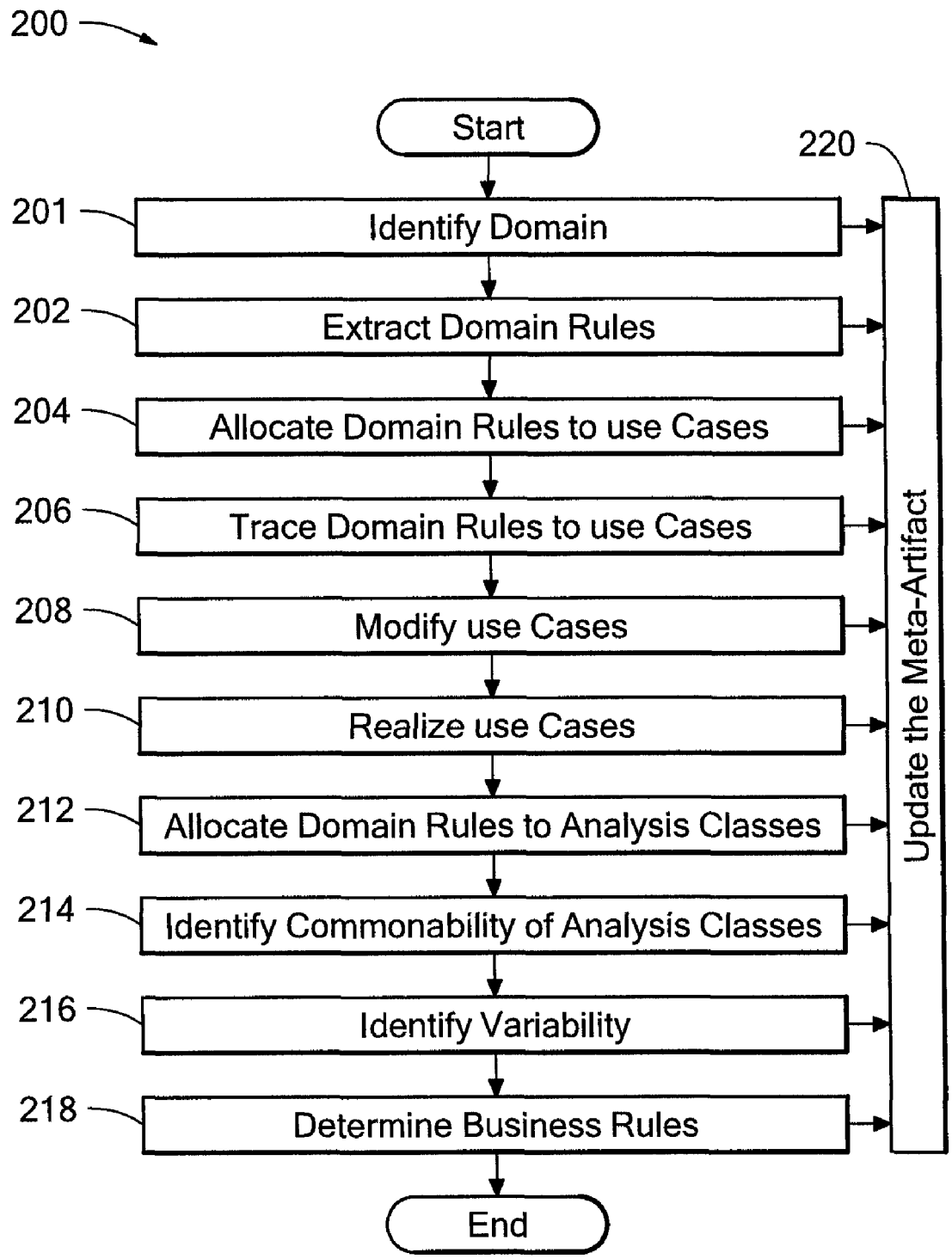
FIG. 6 is a flowchart of an example of a process to generate domain rules.

FIG. 6 depicts a process 200, which is an example of a process to generate domain rules. The process 200 generates domain rules by capturing the domain rules in use cases and analyzing the domain rules in use case realizations. Domain rules may be generated for domains such as accounting information systems and command and control systems.

The domain is identified (processing block 201). A domain includes an area of knowledge or activity characterized by a set of concepts and terminology understood by practitioners in that area. For example, command and control systems and accounting information systems are examples of domains.

Domain rules are extracted from primary, secondary, and other sources (processing block 202). An example of a domain rule for the accounting information system may include ensuring that debits and credits are balanced, and a domain rule for the command and control system may include place the enemy in a position of disadvantage through the flexible application of combat power. The domain rules may be gathered according to the Rational Unified Process (RUP) and the Unified Development Process (USDP).

Sources may include, for example: explicit definitions and literature for the domain; traditional subdomains, functions, methods, processes, and procedures; and established processing cycles, business processes, or patterns. Explicit definitions of the domain may occur in, for example, natural or legislated laws, standards or regulations promulgated by professional organizations, or works by widely recognized researchers or practitioners. A domain may be divided into subdomains in accordance with the functions associated with the domain.

Figure 7:
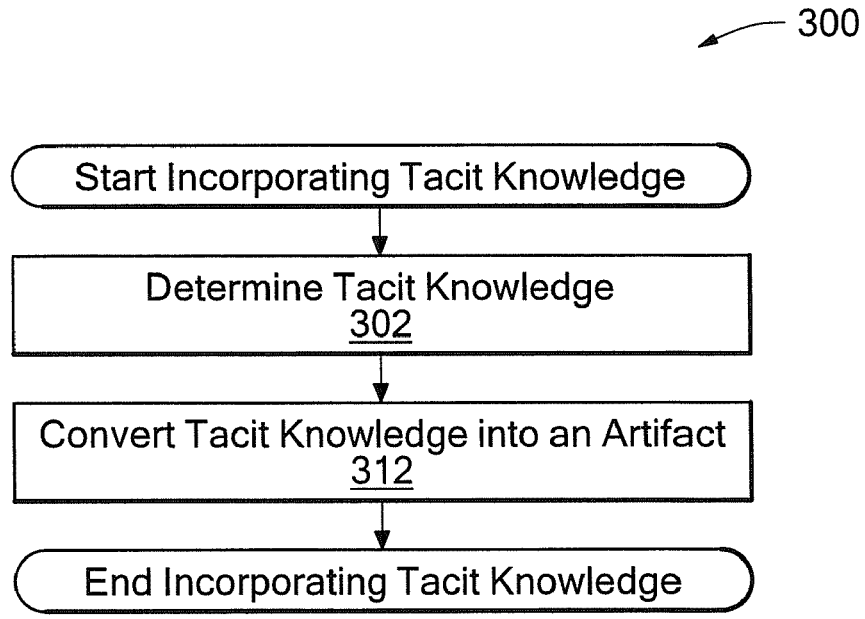
FIG. 7 is a flowchart of an example of a process to convert tacit knowledge

In one example, domain rules are extracted from tacit knowledge (FIG. 7).

Processing cycles and patterns suggest what the function should accomplish and how the functions and the components within them should interact. TABLE 5 lists examples of processing cycles for an accounting information system.

TABLE 5

| Cycle Name | Description |
| --- | --- |
| Cash payments | Supplier or vendor invoice, receiving report, written cheek |
| Cash receipts | customer checks and remittance advices |
| Payroll | Time cards, paychecks |
| Production | Materials requisition, labor time cards, production order, operations list |
| Facilities | Documents supporting the purchase of property, plant, and equipment |
| General ledger | Adjusting, closing, and correcting entries and input from various feeder cycles, e.g., expenditure and sales |
| Financing | Capital raising, e.g., bank notes, bond agreements, common stock issuances |
| Investment | Stocks, bonds, CDs, repurchase agreements |
| Purchasing | Purchase requisition, purchase order |
| Sales | Customer order, customer purchase order, bill of lading invoice |

TABLE 6 lists examples of patterns for the C4ISR system.

TABLE 6

| Name | Description |
| --- | --- |
| Plan | Translation of higher Commander's vision/intent into specific Courses Of Action (COAs) in a compressed plan cycle for preparation and execution by subordinate elements. Define battle space areas of operation for synchronization and control Generate alternate courses of action and evaluate against most likely and dangerous adversary actions. Develop synchronized schedule of tasks and activities for subordinates to prepare and execute. Develop integrated, combined effect operations plan to include all the battlefield functional areas. |
| Prepare | Activities by the unit before executing, to improve its ability to conduct the planned operation, including plan refinement, force protection, rehearsal, reconnaissance, integration and coordination of warriors and resources, inspections, and movement to planned locations. |
| Execute | Apply combat power to accomplish the planned mission, exercise control through assessment of battlespace to understand the situation in order to make execution and adjustment decisions for baffle management. |
| Assess | Monitor and evaluate on a continuous basis throughout planning, preparation and execution the current situation and progress of an operation and the evaluation of it against criteria of success to make decisions and adjustments. |

The domain rules are allocated to use cases (processing block 204). The domain rules may include functional and non-functional domain rules. Functional domain rules include rules that are implemented by a specific function, and non-functional domain rules include system properties that are not directly implemented by a specific function. Non-functional domain rules may be allocated to use cases along with other non-functional requirements for realization, and may be allocated to use cases that they affect. For example, a performance requirement may be allocated to a use case that has functional requirements that would affect the performance criteria. If the affected use cases are subsequently realized, the non-functional requirements may be allocated to the analysis classes as tagged values, constraints, or documentation notations.

Domain rules are traced to use cases (processing block 206) to determine if the domain rules have been allocated to appropriate use cases. The use cases are realized through collaborations (processing block 210) in order to identify any gaps at the next level. If capabilities from the supplemental sources seem to go beyond the domain rules, it may be determined whether implicit domain rules are imbedded in the capabilities or if the capabilities are unnecessary, for example, they lie outside the domain, they are redundant, or they are obsolete.

Use cases may be modified or added (processing block 208). The addition or modification may occur at this iteration or subsequent iterations. Use cases are realized (processing block 210) by identifying analysis classes and creating collaborations. Use cases may be realized for some requirements before other requirements. For example, use cases may be realized for requirements related to requests for initiating the development of the program. These requirements may be solution-oriented, and may tend to focus on a specific application. The other requirements, however, may be considered in order to complete the problem space. Domain rules are allocated to analysis classes (processing block 212).

Commonalties of analysis classes are identified (processing block 214). Commonalties are identified by determining the analysis classes that appear in multiple use cases. Stable variability of the analysis classes (processing block 216) may be identified through subsequent analysis and generation of the common classes. Business rules that capture the volatile variability of the program are determined (processing block 218). After determining the business rules, the method terminates for the iteration.

After each processing blocks 200, 202, 204, 206, 208, 210, 212, 214, 216, and 218, the meta-artifact 64 is updated (processing block 218) keeping the meta-artifact 64 current.

Unlike previous systems, system 10 captures tacit knowledge in the meta-artifact. Tacit knowledge refers to implicit knowledge that may be unspoken or taken-for-granted that is embedded in human routines and organizational practices. In one example of tacit knowledge, people may perform activities as routines that they give little or no thought to, especially the reasons for performing them. Some of theses routines may be unnecessary. For example, if a new automated system were based on tacit knowledge (e.g., performing a routine based on the implicit assumption that there was good reason to do so in a certain way), an unnecessary step may be included.

In a second example of tacit knowledge, an old system may perform functions that are not known or incompletely known to the people using the old system. If the old system is replaced with a new system such unknown or incompletely known functions may not be performed by the new system and their absence may go undetected until the effect becomes apparent in the results produced by the new system, e.g., an erroneous calculation or a certain type of error that had been detected by a missing function.

FIG. 7 depicts an example of a process, for example, a process 300, to incorporate tacit knowledge into explicit knowledge for inclusion in the meta-artifact 64. Tacit knowledge is determined (processing block 302). For example, knowledge management techniques are used including phenomenological methods. In particular, phenomenological analyses of stakeholder and organizational activities, history, routines, documentation, and systems, including automated systems, are performed. For example:

Stakeholders may be observed in the performance of their tasks to identify routines that the stakeholder may take for granted as necessary, but which may not be, based on historical analysis of the origins of the routines Organizational procedures may be traced through organizational history (oral or written) to find the original purpose and determine if it still applies Systems may be observed producing results for which there is no known purpose A comparison of stakeholders actions with organizational history (oral or written) may identify defects or omissions in the stakeholders' actions Based on such phenomenological analyses, undocumented or unsupported routines, procedures, and results are identified, documented, then eliminated, revised, or added to improve performance.

The tacit knowledge is converted into an artifact (processing block 312). For example, the tacit knowledge is converted into an artifact and linked to one or more artifacts in the meta-artifact 64. In one example, the tacit knowledge is incorporated into the sources of requirements artifact 102*b* (FIG. 3).

Figure 8:
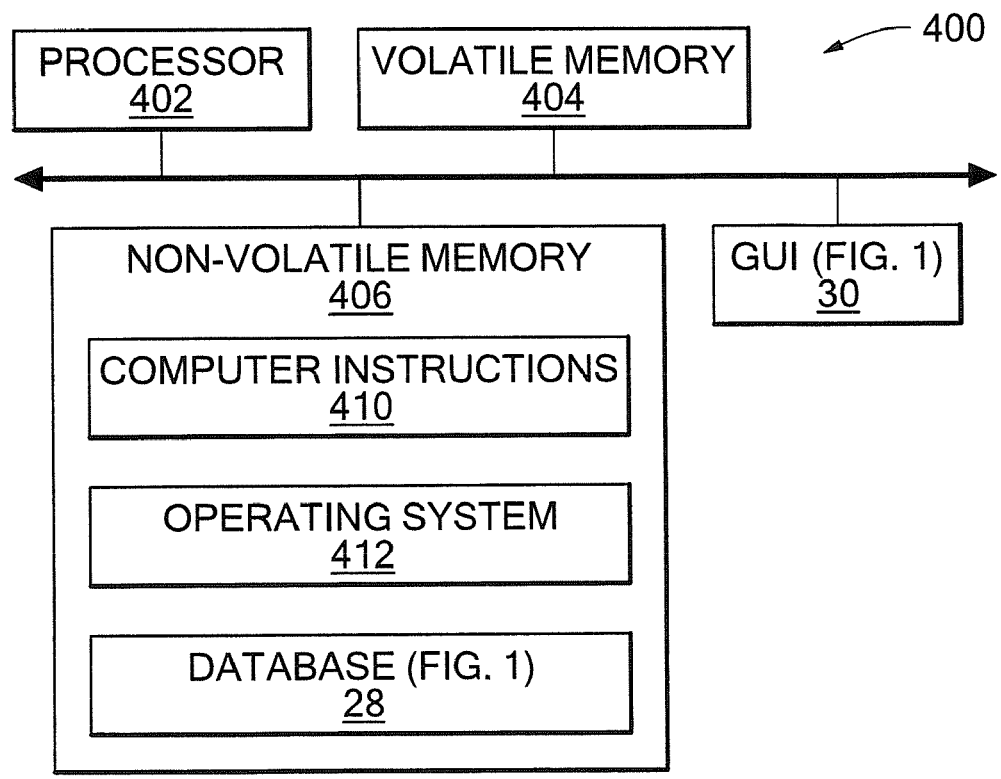
FIG. 8 is a block diagram of an example of a computer to perform the process in FIG. 2.

FIG. 8 shows an example of a computer 400 that may be used to perform one or more processing blocks of processes 70, 200 and 300. The computer 400 includes a processor 402, a volatile memory 404, a non-volatile memory 406 (e.g., hard disk) and GUI 30. Non-volatile memory 406 includes computer instructions 410, an operating system 412 and database 28.

The processes described herein are not limited to use with the hardware and software of FIG. 8; it may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the processes and to generate output information.

The processes may be implemented, at least in part, via a computer program product, (i.e., a computer program tangibly embodied in a machine-readable storage device) for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

The processing blocks in FIGS. 2, 6 and 7 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

The processes described herein are not limited to the specific embodiments described herein. For example, the processes are not limited to the specific processing order of FIGS. 2, 6 and 7 respectively. Rather, any of the processing blocks of FIGS. 2, 6 and 7 may be re-ordered, combined or removed, performed in parallel or in serial, as necessary, to achieve the results set forth above.

Elements of different embodiments described herein may be combined to form other embodiments not specifically set forth above. Other embodiments not specifically described herein are also within the scope of the following claims.

What is claimed is:

1. A method to generate executable instructions, comprising:

incorporating tacit knowledge into an artifact;

actively linking electronically the artifact to at least one other artifact of a system, the artifact and the at least one other artifact forming a meta-artifact associated with a domain; and generating the executable instructions based on the meta-artifact; and updating the meta-artifact based on the executable instructions generated;

generating different executable instructions based on updating the meta-artifact;

wherein the meta-artifact is configured to dynamically change over time through an iterative process, and wherein updating the meta-artifact comprises incorporate the executable instructions into at least one artifact.

2. The method of claim 1 wherein incorporating the tacit knowledge into an artifact comprises determining the tacit knowledge using knowledge management techniques.

3. The method of claim 1 wherein incorporating the tacit knowledge into an artifact comprises converting the tacit knowledge into explicit knowledge.

4. An article comprising a non-transitory machine-readable medium that stores a first set of executable instructions to generate a second set of executable instructions, the first set of instructions causing a machine to:

incorporate tacit knowledge into an artifact;

actively link electronically the artifact to at least one other artifact of a system, the artifact and the at least one other artifact forming a meta-artifact associated with a domain; and generate the second set of executable instructions based on the meta-artifact, update the meta-artifact based on the second set of executable instructions generated;

generate a third set of executable instructions based on updating the meta-artifact;

wherein the meta-artifact is configured to dynamically change over time through an iterative process, and wherein the instructions causing a machine to update the meta-artifact comprises instructions causing a machine to incorporate the second set executable instructions into at least one artifact.

5. The article of claim 4 wherein the instructions causing a machine to incorporate the tacit knowledge into an artifact comprises instructions causing a machine to determine the tacit knowledge.

6. The article of claim 4 wherein the instructions causing a machine to incorporate the tacit knowledge into an artifact comprises instructions causing a machine to convert the tacit knowledge into explicit knowledge.

7. An apparatus to generate executable instructions, comprising:

circuitry to:

incorporate tacit knowledge into an artifact;

actively link electronically the artifact to one or more other artifacts of a system, the artifact and the one or more artifacts forming a meta-artifact associated with a domain; and generate the executable instructions based on the meta-artifact, update the meta-artifact based on the executable instructions generated;
generate different executable instructions based on updating the meta-artifact;
wherein the meta-artifact is configured to dynamically change over time through an iterative process, and
wherein the circuitry to update the meta-artifact comprises circuitry to incorporate the executable instructions into at least one artifact.

8. The apparatus of claim 7 wherein the circuitry includes at least one of a processor, a memory, programmable logic and logic gates.

9. The apparatus of claim 7 wherein the circuitry to incorporate the tacit knowledge into an artifact comprises circuitry to determine the tacit knowledge.

10. The apparatus of claim 7 wherein the circuitry to incorporate the tacit knowledge into an artifact comprises circuitry to convert the tacit knowledge into explicit knowledge.

11. A method to generate executable instructions, comprising:
actively linking electronically a first artifact to one or more other artifacts of a system, the artifact and the one or more artifacts forming a meta-artifact associated with a domain;
generating the executable instructions based on the meta-artifact;
updating the meta-artifact based on the executable instructions generated; and
generating different executable instructions based on updating the meta-artifact,
wherein the meta-artifact is configured to dynamically change over time through an iterative process, and
wherein updating the meta-artifact comprising incorporate the executable instructions into at least one artifact.

12. The method of claim 11 wherein the first artifact is associated with sources of requirements of the system.

13. The method of claim 12 wherein the sources of requirements of the system include domain rules.

14. The method of claim 13 wherein the at least one other artifact is associated with requirements identification.

15. The method of claim 1, further comprising using the meta-artifact as a final product of executable instructions.

16. The article of claim 4 wherein the meta-artifact is usable as a final product of executable instructions.

17. The apparatus of claim 7 wherein the meta-artifact is usable as a final product of executable instructions.

* * * * *